United States Patent [19]

Satoh et al.

[11] 4,239,957
[45] Dec. 16, 1980

[54] DISPLAY APPARATUS FOR TAPE RUNNING POSITIONS

[75] Inventors: Ken Satoh; Kenzi Furuta, both of Hachioji, Japan

[73] Assignee: Olympus Optical Co., Ltd., Tokyo, Japan

[21] Appl. No.: 944,061

[22] Filed: Sep. 20, 1978

[30] Foreign Application Priority Data

Sep. 30, 1977 [JP] Japan .................... 52-117556

[51] Int. Cl.³ .................................. H03K 21/18
[52] U.S. Cl. .................... 235/92 DN; 235/92 MP; 235/92 R; 235/92 EA
[58] Field of Search ....... 235/92 MP, 92 DN, 92 EV, 235/92 EA, 92 CC, 103, 103.5 R, 104; 360/72.1, 72.3, 74.2, 90; 242/DIG. 1

[56] References Cited

U.S. PATENT DOCUMENTS

| | | | |
|---|---|---|---|
| 2,944,750 | 7/1960 | Hall | 235/103 |
| 3,564,219 | 2/1971 | Mutziger | 235/92 R |
| 4,001,552 | 1/1977 | Muller | 235/92 CA |

FOREIGN PATENT DOCUMENTS

| | | | |
|---|---|---|---|
| 2008494 | 9/1971 | Fed. Rep. of Germany | 235/92 R |
| 2111006 | 4/1976 | Fed. Rep. of Germany | 235/92 R |

*Primary Examiner*—Leo H. Boudreau

[57] ABSTRACT

A display apparatus for tape running positions is provided with a first pulse generator (36) for generating m first pulses for each revolution of a supply reel (12) in a tape transport system, a second pulse generator (38) for generating n second pulses for each revolution of a take-up reel (14), counter (48, 58) for counting the number of the first pulses during one period of the second pulse, and means (50, 64) for providing preset data to make zero a count value in the counter at the initial stage of tape running. The change ratio of a count value in the counter counted from the start i.e. zero to the maximum of the tape running position is expanded to the square of the rotational speed change ratio of the reel from the beginning to the end of tape winding of the supply (take-up) reel. A counting range of the counter at this time is proportional to m/n. The zero point of the tape running position is displayed zero.

14 Claims, 13 Drawing Figures

DISPLAY APPARATUS FOR TAPE RUNNING POSITIONS

BACKGROUND OF THE INVENTION

The invention relates to a display apparatus for tape running positions used in tape recorders, for example.

In general, the tape recorder is provided with a counter for indicating or displaying tape running positions or an amount of tape running. Frequently, for the tape counter a mechanical tape counter is used in which a numeral corresponding to the rotational speed of a tape reel is displayed by a mechanical means. The mechanical tape counter, however, suffers from various inherent factors causing errors and is insufficient in display precision for the tape running position. One of the countermeasures against the disadvantage is a recent development of an electronic counter for displaying the tape running position by means of an electronic means. By convention, the electronic tape counter forms a signal representing the tape running position from a predetermined correlation between the rotational speeds of the capstan shaft and the take-up (or supply) reel shaft in the tape transport system. In such an electronic counter, the tape is not driven in a fast forward wind or rewind mode, so that the correlation between the capstan and reel shafts is independent of the tape running position. For this, the conventional electronic tape counter loses the function of a tape counter in the fast forward wind or rewind modes.

Further, the conventional electronic counter is defective in the tape counter precision when the tape is driven by the capstan. This arises from the fact that the ratio with respect to a change of the rotational speed of the reel shaft is small when the amount of tape taken up by the tape reel changes from zero to the maximum. The change ratio is generally 2 to 3 in a cassette type tape recorder. For example, a decimal number of three digits is assumed to be used for digitally displaying the tape running positions. In this case, at least 100 data must be taken out from the change ratio of 2 to 3. Usually, the tape base uses a thin and flexible polyester film. For this, it is very difficult to correctly take out a number of data from such a small change ratio. For example, the outer diameter of the tape when the tape of 30 m is taken up around the tape reel under a slight tension in fast forward wind is slightly different from that when the same is taken up under a high tension in the playback. In other words, even if the lengths of the tape taken up are the same, the display numerals by the tape counter incorrectly indicate the tape length taken up, or the tape running position, because the rotational speed of the reel shaft can not be defined unconditionally. The incorrectness of the indication is more remarkable as the change ratio is smaller and the display digits are larger.

SUMMARY OF THE INVENTION

Accordingly, an object of the invention is to provide a display apparatus for tape running positions in which the tape running position can precisely be displayed even if the tape runs in any type of operation mode.

To achieve the object of the invention, there is provided a display apparatus for tape running positions comprising: a first signal generator for providing a first signal within a period corresponding to the rotational speed of a first reel in a tape transport system; a second signal generator for providing a second signal within a period corresponding to the rotational speed of a second reel in the tape transport system; and a display device for displaying the tape running position which displays the data corresponding to the number of repetitions of the first signal during one period of the second signal.

With the display apparatus for tape running positions thus constructed, a signal with the repetitive number corresponding to the tape running position may be formed from a change of the square of a change ratio with respect to the rotational speed of a tape reel from the beginning to the end of tape winding. Accordingly, the signal change corresponding to the tape running positions is great so that the display precision of the tape running position is improved. The repetitive number of the signal for displaying the tape running position is determined depending on the correlation between the amount of the tape taken up by the first reel and the amount of the tape by the second reel, and is independent of the running direction of the tape and the running speed. Therefore, even if the tape is driven in any operation mode, the display apparatus can correctly display the tape running position.

BRIEF DESCRIPTION OF THE DRAWINGS

Other objects and features of the invention will be apparent from the following description taken in connection with the accompanying drawings, in which.

DESCRIPTION OF THE PREFERRED EMBODIMENTS

Figure 1:
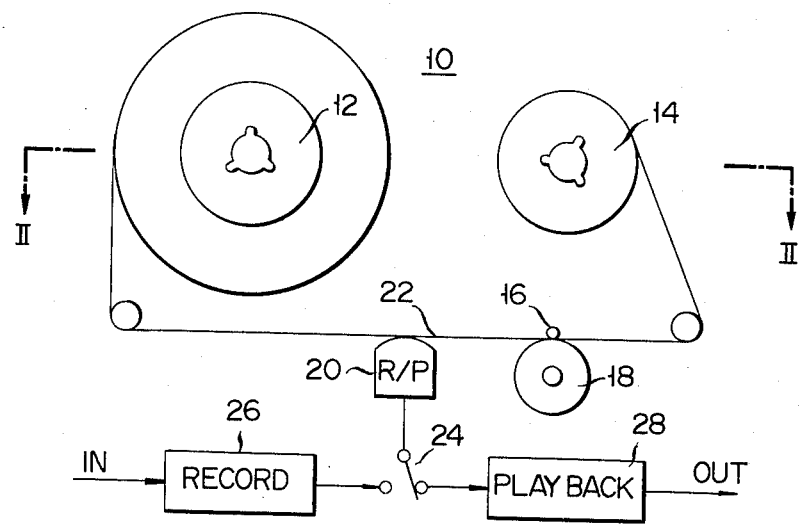
FIG. 1 shows a schematic diagram of a tape transport system of a tape recorder.

Some preferred embodiments of the invention will be described in detail with reference to FIGS. 1 to 11. Throughout the description to be given, like or similar parts or portions will be designated by like or similar reference numerals, for simplicity of explanation.

Reference is first made to FIG. 1 schematically illustrating a tape recorder. As shown, a tape transport system 10 is comprised of a supply reel 12, a take up reel 14, a capstan 16, a pinch roller 18 and a record/playback magnetic head 20. A recording tape 22 is driven by the capstan 16 and the pinch roller 18 in a record or a playback mode and is driven by the supply reel 12 or the take-up reel 14 in a rewind or a fast forward wind mode. The head 20 is coupled with a recording amplifier 26 or a playback amplifier 28, through a switch 24.

Figure 2:
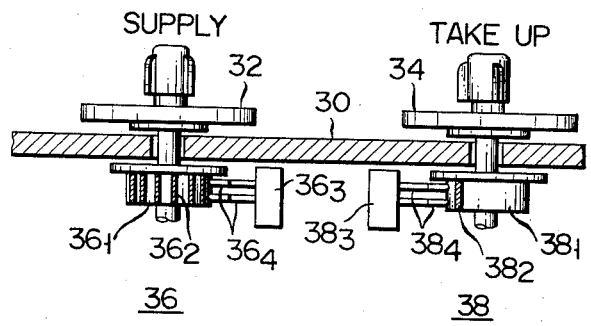
FIG. 2 shows a partial cross section of a part of the tape transport system taken on line II—II in FIG. 1.
Figure 3:
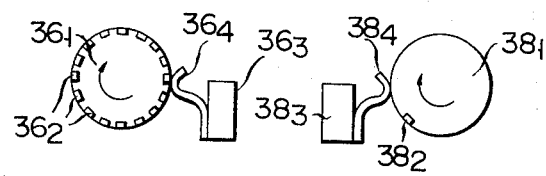
FIG. 3 shows a bottom view of the tape transport system part in FIG. 2.

FIG. 2 shows a partial cross sectional view of the tape transport system 10 taken along line II—II in FIG. 1 and FIG. 3 shows a bottom view of the tape transport system in FIG. 2. A supply reel support 32 for supporting the supply reel 12 and a take-up reel support 34 for supporting the take-up reel 14 are disposed on the top surface of a casing 30. The reel supports 32 and 34 are pivotally supported by a mechanism of the tape transport system 10 and are rotated by a motor through a rotation transfer mechanism (not shown). Coupled with the reel supports 32 and 34 are a first pulse generator 36 and a second pulse generator 38, respectively. The first pulse generator 36 has m conductive pieces $36_2$ equiangularly disposed therearound, a first rotor $36_1$ coaxially set to the reel support 32 and a first sensor $36_3$ with two slip contactors $36_4$. Similarly, the second pulse generator 38 has n conductive pieces $38_2$ equiangularly disposed therearound, a second rotor $38_1$ coaxially set to the reel support 34, and a second sensor $38_3$ with two slip contactors $38_4$. The rotors $36_1$ and $38_1$ are each made of insulating material such as acrylonitrile-butadiene-styrene (ABS) resin. During one revolution, conductive pieces $36_2$ and $38_2$ will generate m and n number of pulses, respectively.

Assume now that the number m of the conductive pieces $36_2$ is 16 and the number n of the conductive pieces $38_2$ is 1. On this assumption, the first sensor $36_3$ turns on and off 16 times for each revolution of the supply reel 12 and the second sensor $38_3$ turns on and off one time for each revolution of the take-up reel 14. In other words, the first pulse generator 36 produces 16 pulses m for each revolution and the second pulse generator 38 produces one pulse n for each revolution.

Figure 4:
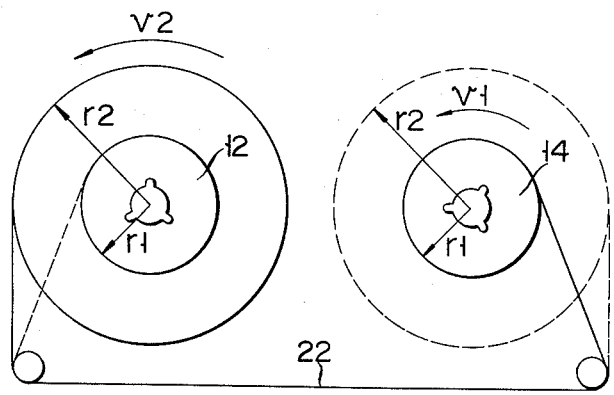
FIG. 4 schematically shows the amount of a tape taken up by a tape reel and illustrates the relationship between the radius of the tape reel and the rotational speed of the tape reel at that time.

In FIG. 4 which will now be referred to, a continuous line indicates the state in which the amount of the tape 22 taken up by the supply reel 12 is at the maximum and a broken line indicates the state in which the amount of the tape 22 taken up by the take-up reel 14 is at the maximum. In the case of a microcassette tape, the ratio of the reel radius $r_1$ when the amount of the tape taken up is zero, i.e. at the minimum, to the reel radius $r_2$ when the amount of the tape taken up is at the maximum, is approximately 1:2. For the purpose of simplification, we will proceed with the explanation on the assumption that $r_1:r_2=1:2$ and that the first pulse generator 36 produces 16 pulses for each revolution of the associated rotor and the second pulse generator 38 produces one pulse for each revolution.

Figure 5A:
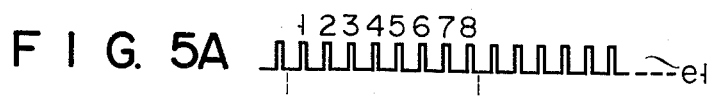
FIGS. 5A and B illustrate the time relation between pulse signals derived from pulse sensors shown in FIG. 2 at the initial stage of the tape running.
Figure 5B:
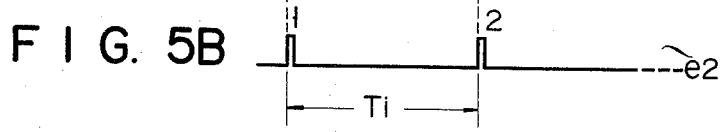
Figure 6A:
FIGS. 6A and B illustrate the time relation between pulse signals derived from pulse sensors shown in FIG. 2 at the final stage of tape running.
Figure 6B:
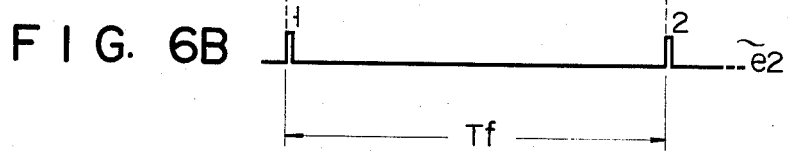

When the amount of the tape taken up by the supply reel 12 is at the maximum, the tape running position is assumed to be zero. At the initial stage of the tape running, $r_1/r_2 = \frac{1}{2}$ so that the supply reel rotates half when the reel 14 revolves one time. In other words, the rotational speed $v_1$ of the take-up reel 14 is two times the rotational speed $v_2$ of the supply reel 12. Accordingly, the first pulse generator 36 produces eight first pulses $e_1$ during a period $T_i$ of the second pulse signal $e_2$ generated by the second pulse generator 38, as shown in FIGS. 5A and 5B. At the final stage of tape running, the radius of the take-up reel 14 is $r_2$ so that the supply reel 12 rotates two times when the take-up reel 14 rotates one time. That is, the number of the first pulses $e_1$ is 32 during one period $T_f$ of the second pulse signal $e_2$, as shown in FIGS. 6A and 6B.

In other words, the number of pulses m in the first pulse signal $e_1$ during one period of the second pulse signal $e_2$ increases proportional to the tape running amount. Accordingly, an electronic tape counter may be constructed in such a way that the first pulse signal is counted (sampled) by using the second pulse signal $e_2$. Note here that, although the ratio of the maximum rotational speed $v_1$ of the reel 12 or 14 to the minimum rotational speed $v_2$ of the same is "2," the ratio of the maximum count (32) as a result of counting the first pulse signals $e_1$ to the minimum count (8) thereof is "4." That is to say, a conventional counter takes out the tape running position data from the pulse number change ratio of "two"; however, when the example mentioned above is used, the same data may be taken out from the ratio of "four."

Similarly, when the speed change ratio $(v_1/v_2)$ of the reel is "3," the period change of the second pulse signal $e_2$ becomes "3" and the pulse number change ratio of the first pulse signal $e_1$ also becomes "3." Accordingly, the tape running position data is taken out from the signal change ratio of $3^2 = 9$. With designation of N for the rotational speed change of the reel, and m and n denoting the number of pulses constituting signals $e_1$ and $e_2$, respectively the maximum and minimum counts are:

$$C_{max} \text{ (the maximum count)} = mN/n$$

$$C_{min} \text{ (the minimum count)} = m/nN$$

Therefore, the maximum change ratio of the count is $$C_{max}/C_{min} = (mN/n)/(m/nN) = N^2 \quad (1)$$

The maximum change width of count is $$C_{max} - C_{min} = (mN/n) - (m/nN) = m/n(N - 1/N) \quad (2)$$

The equation (1) indicates that, when a tape transport system permitting N times the rotational speed change of the reel is used, the tape running position data may be taken out from the signal change of $N^2$. The equation (2) shows that the resolving power or minuteness of tape running position display may be improved by using large m/n and/or N. When large m/n and N is used, the display precision is improved in the analogue display as well as the digital display. However, when the N is small, an error due to the extension of the tape base restricts the improvement of the display precision by making m/n large. Nevertheless, in the display apparatus according to the invention, the N is essentially expanded to $N^2$ so that the improvement of the display precision by making m/n large is better than that in the conventional display apparatus. Thus, when the counter according to the invention is used, the display precision of the tape running position is improved proportional to the square of the change ratio with respect to the rotation number of the reel shaft.

Figure 7:
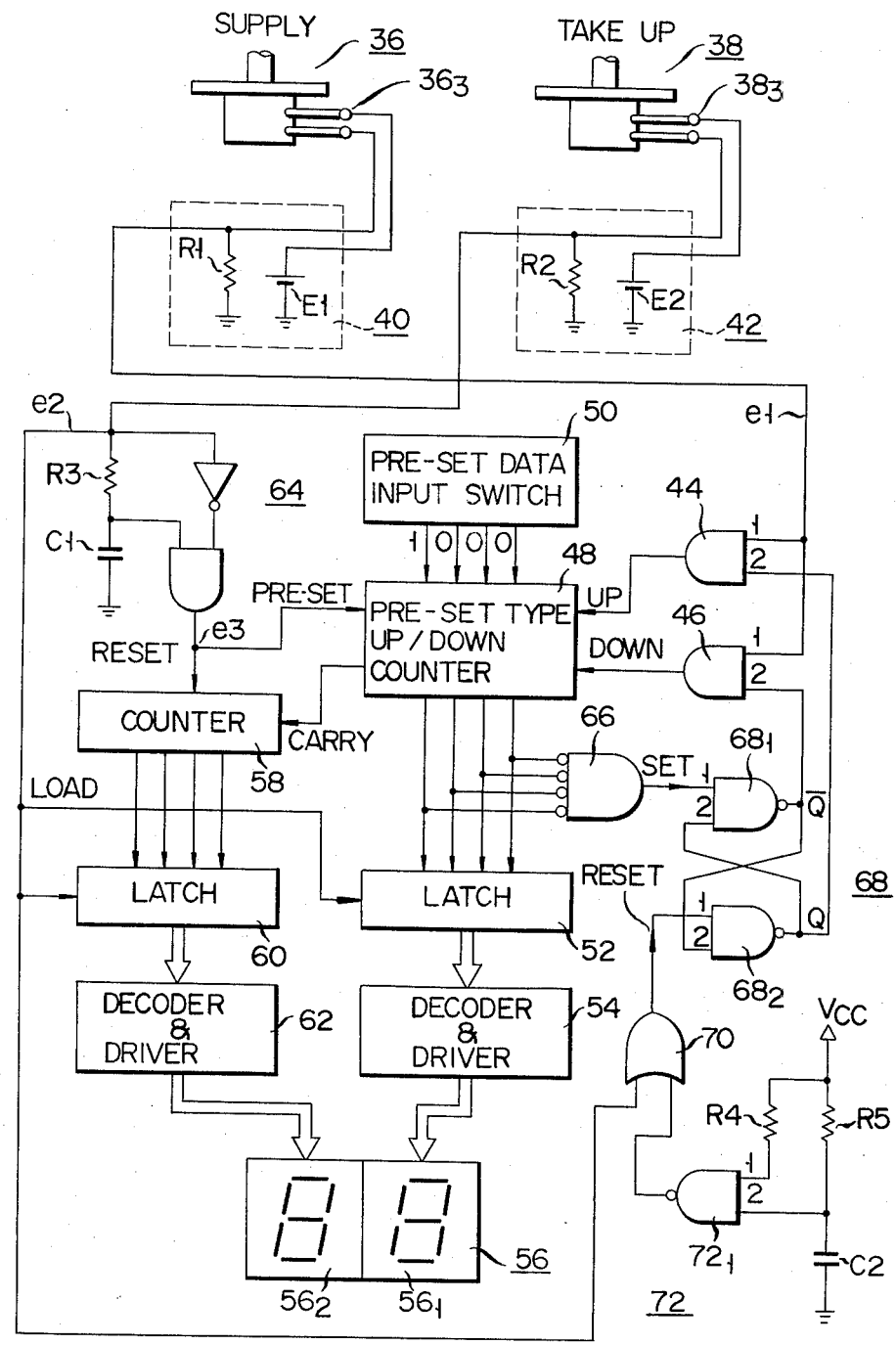
FIG. 7 shows a circuit diagram of a counter for digitally displaying tape running positions by using pulse signals derived from the pulse sensors shown in FIG. 2.

FIG. 7 shows a counter unit for digitally displaying the tape running position by using the pulse sensors 36 and 38 shown in FIG. 2. Two electrode terminals $36_3$ of the first sensor 36 are connected to the positive terminal of a DC power source E1 and one of the terminals of a load resistor R1. The negative terminal of the power source E1 and the other terminal of the resistor R1 are grounded. The power source E1 and the resistor R1 constitute a converter 40 for converting a mechanical on/off operation into a positive electric pulse. Similarly, two electrode terminals $38_3$ of the second sensor 38 are connected to a converter 42 comprised of a DC power source E2 and a load resistor R2. The converter 40 provides the positive first pulse signal $e_1$ and the converter 42 provides the positive second pulse signal $e_2$.

The first pulse signal $e_1$ is applied through first input terminals of AND gates 44 and 46 to an up-count input terminal or a down-count input terminal of an up/down decimal counter 48 of preset type. To the counter 48 is applied the preset data from a preset data input switch 50. A decimal number "8" (corresponding to "1000" of BCD code) is used for the preset data, for example. The output of the counter 48 is applied to the first digit $56_1$ of a display device 56, through a latch circuit 52 and a decoder/driver 54. The carry signal of the counter 48 is inputted to a clock input terminal of a decimal counter 58. The count output (BCD code) of the counter 58 is applied through a latch circuit 60 and a decoder/driver 62 to the second digit $56_2$. The second pulse signal $e_2$ is applied, as a load signal for controlling a temporary storing operation of the latch circuits 52 and 60, to the latch circuits 52 and 60. The second pulse signal $e_2$ is also delayed by the time period corresponding to a time constant $(C1 \times R3)$ by a delay circuit 64, and is converted into a third pulse signal $e_3$ for preset and reset. The third pulse signal $e_3$ is applied to a preset input terminal of the counter 48 in order to preset data "8" specified by the input switch 50 in the counter 48. The third pulse $e_3$ is also applied to the reset input terminal of the counter 58, in order to reset the output of the counter 58 to be "0."

The count outputs of four bits from the counter 48 are applied to the first input terminal of a NAND gate $68_1$, through a NAND gate 66 with four inverted input terminals. The second input terminal of the NAND gate $68_1$ is connected to an output terminal of a NAND gate $68_2$ and the second input terminal of the NAND gate $68_2$ is connected to an output terminal of the NAND gate $68_1$. The NAND gate $68_1$ and $68_2$ constitute a flip-flop 68. The outputs of the NAND gates $68_1$ and $68_2$ are applied to the second input terminals of the AND gates 46 and 44. The flip-flop 68 controls the open and close states of the AND gates 44 and 46. That is, the first pulse signal $e_1$ is applied to either of the up-count input terminal of the counter 48 or the down-count input terminal.

To the input terminal of the NAND gate $68_2$ is applied an output signal of an OR gate 70. The OR gate 70 logically sums the second pulse signal $e_2$ and the output signal of a power source reset circuit 72 i.e. a power source reset pulse. The power source reset circuit 72 includes a NAND gate $72_1$ and the first input terminal of the NAND gate $72_1$ is coupled with a power source Vcc, through a resistor R4. The power source Vcc is connected to the second input terminal of the NAND gate $72_1$, through a charging/discharging circuit including a resistor R5 and a capacitor C2. Immediately after a power switch of the counter unit is turned on, the capacitor C2 is not yet charged so that the second input terminal of the NAND gate $72_1$ is at a low level. The output level of the NAND gate $72_1$, that is to say, one of the input levels of the OR gate 70, becomes high and therefore the output level of the OR gate 70 becomes high. The high level output of the OR gate 70 is applied to the reset input terminal of the flip-flop 68, i.e. the first input terminal of the NAND gate $68_2$. Thus, in this manner, the power-on operation temporarily resets the flip-flop 68. The power reset circuit 72 may be constructed as a one-shot multivibrator triggered by the power-on operation. On the other hand, when the capacitor C2 is charged and the second input terminal of the NAND gate $72_1$ becomes high in level, the output of the NAND gate $72_1$ becomes low in level. When the flip-flop 68 is reset, the NAND gates 44 and 46 are closed and opened, respectively, while the NAND gates 44 and 46 are respectively opened and closed at the time when the flip-flop 68 is set by the high level output of the NAND gate 66. Namely, the counter 48 is down-counting the first pulse signal $e_1$ when the flip-flop 68 is reset. On the contrary, when the flip-flop 68 is set, the counter 48 is up-counting the first pulse signal $e_1$.

The operation of the counter unit shown in FIG. 7 will be described with reference to FIGS. 5 and 6. Upon turning on the power source, the flip-flop 68 is reset and the counter 48 is in a down count state. At the tape running position of zero, i.e. the initial stage of the tape running, the first occurring pulse of $e_2$ causes the contents of the counters 48 and 58 to be loaded into the latch circuits 52 and 60. The contents of the counters 48 and 58 at this time is not limited to a specific one. Upon the completion of loading, the third pulse signal $e_3$ immediately presets data "8" in the counter 48 and the counter 58 is reset. When the preset/reset operation is completed, the counter 48 initiates the down counting of the first pulse signal $e_1$. At the zero of the tape running position, eight pulses of $e_1$ take place until the next pulse $e_2$ appears. The data "8" preset in the counter 48 becomes "0" which in turn is applied to the latch circuit 52. At this time, the contents of the counter 58 remains "0." That is, the next pulse $e_2$ causes data "0" to be loaded into the latch circuits 60 and 52. Then, the display unit 56 displays "0, 0" of the tape running position.

Let us assume now that the tape running amount increases to the amount corresponding to the tape running position (02), for example. As described above, after the first pulse $e_2$ takes place, the pulse $e_1$ is counted down up to eight. When the pulse $e_1$ is counted down eight times, the outputs of four bits of the counter 48 become all zero. Following this, the output of the NAND gate 66 becomes high in level and the flip-flop 68 is set. Then, the signal circuit of $e_1$ is switched to the up count input terminal of the counter 48. The 9th and 10th pulse of $e_1$ are counted up two times by the counter 48. Accordingly, when the next pulse $e_2$ is produced, the counters 58 and 48 produce "0" and "2" at the outputs, respectively. The next pulse $e_2$ loads data "0" and "2" into the latch circuits 60 and 52 and the flip-flop 68 is again reset. The display unit 56 displays the tape running position "0, 2".

Similarly, at the maximum of the tape running position, i.e. the final stage of tape running, after the first occurring pulse of $e_2$ appears, the pulse $e_1$ is down-counted eight times. With respect to the 9th pulse and the succeeding ones of $e_1$, these are up-counted. At the final stage of tape running, 32 pulses of $e_1$ occur during one period $T_f$ of the pulse $e_2$. Accordingly, until the next pulse $e_2$ takes place, the counter 48 counts up 24 $(32-8=24)$ times. That is to say, the counter 48 provides the carry signal two times to the counter 58. Therefore, the outputs of the counters 58 and 48 become "2" and "4" and the display unit 56 displays "2, 4" of the tape running position. In other words, the entire tape running amount is divided into 24 segments and 0 to 24 are assigned to the tape running positions.

Note here that in the above description the count error of ±1 inherent to the digital counter is neglected.

Figure 8:
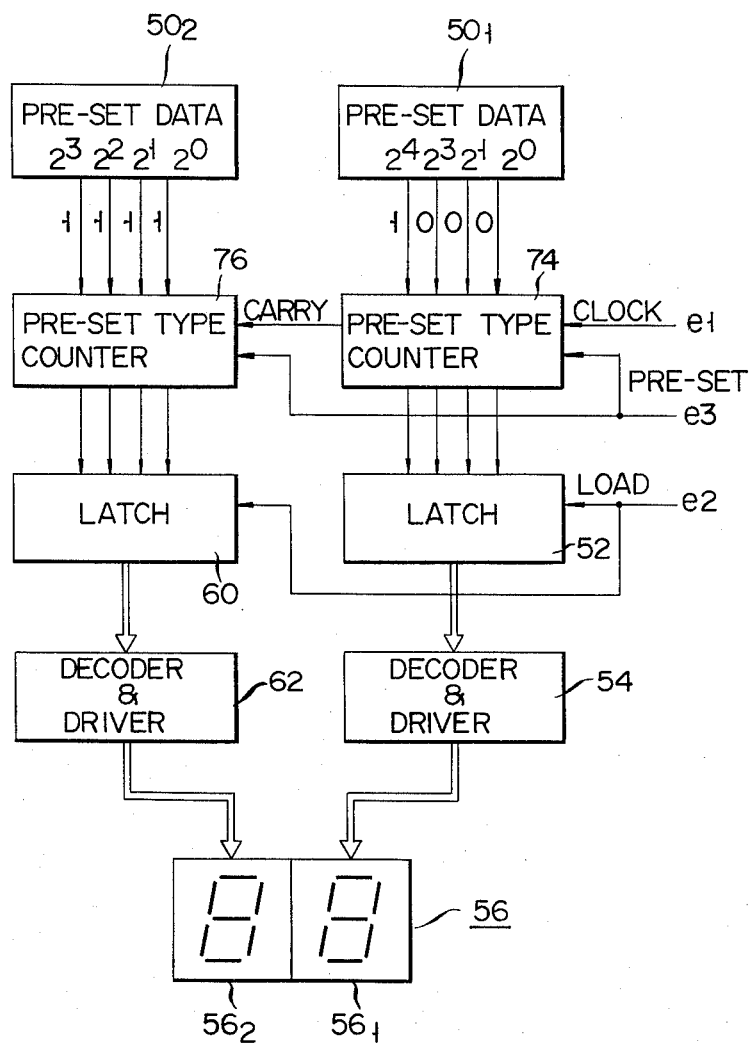
FIG. 8 shows a modification of the counter shown in FIG. 7.

Turning now to FIG. 8, there is shown a modification of the counter unit in FIG. 7. In this example, two preset type decimal counters 74 and 76 are used in place of the up/down counter. The first pulse signal $e_1$ is applied as a clock signal to the counter 74 and the carry signal of the counter 74 is inputted into a clock input terminal of the counter 76. To the counters 74 and 76 are connected preset data input switches $50_1$ and $50_2$. In this example, the preset data of the input switch $50_1$ is "8" ("1000" of BCD code) and the preset data of the input switch $50_2$ is "F" ("1111" of BCD code). The preset data "8" and "F" are preset in the counters 74 and 76 by the third pulse signal $e_3$.

The operation of the counter unit shown in FIG. 8 will be given with reference to FIGS. 5 and 6. When the tape running position is zero, the counter 74 counts eight pulses of $e_1$ during one period $T_i$ of the pulse signal $e_2$. Then, the contents of the counter 74 becomes "0" and at the same time the carry signal of one is applied from the counter 74 to the counter 76. And the contents of the counter 76 is changed from "F" to "0." That is, when the tape running position is zero, the display unit 56 displays "0, 0." When the tape running position is at the maximum, the operation is the following. The operation till the 8th pulse of $e_1$ is similar to that mentioned above. When the 8th pulse occurs the contents of the counters 74 and 76 become both "0." Accordingly, 24 pulses from the 9th to 32nd are counted up as in the usual counter having no preset data. That is, at the maximum position of tape running, the display unit 56 displays "2, 4."

The embodiments in FIGS. 7 and 8 employ two digits of the display format for the display unit 56. However, when the number of the first pulse signal $e_1$ occurring during one period of the second pulse signal $e_2$ is increased, the digit number may be increased. Let us consider a case where a three digits format is used for the display unit 56, the number m of pulses of $e_1$ for each revolution of the reel support 32 is 100 and the number n of the pulses of $e_2$ for each revolution of the reel support 34 is 1. At the initial stage of tape running, 50 pulses of $e_1$ are produced during one period $T_i$ of the pulse $e_2$. At the final stage of tape running, 200 pulses of $e_1$ is sensed during one period $T_f$ of the pulse $e_2$. In this case, the input switch 50 is so designed as to include preset data enough to offset the clock input signal $e_1$ of 50 pulses. When the circuit in FIG. 8 is designed for the three digits display format, the preset data loaded into the counters of the first to third digits are "0" (0000), "B" (1011), and "F" (1111). If such data is preset in the counters, the display contents of the display unit 56 changes "0, 0, 0" to "1, 5, 0" during the period from the initial to the final stage of tape running.

In either embodiment of FIG. 7 or FIG. 8, the display of the tape running position at the initial stage of tape running may be set to any numerals other than zero. The setting may easily be made by the preset data input switch 50. If the display at the initial stage of tape running is not limited to zero, the input switch 50 may be omitted.

Figure 9:
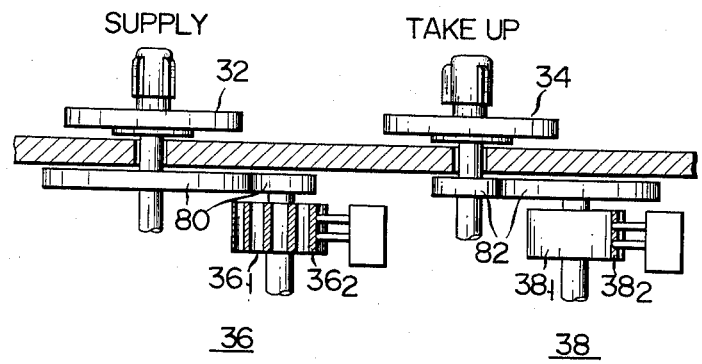
FIG. 9 shows a modification of the construction in FIG. 2 in which rotational speed change mechanisms are provided between reel supports and pulse generators, respectively.

A rotation speed change mechanism may be provided at the coupling portion between the pulse generator 36 and the reel support 32, and between the pulse generator 38 and the reel support 34. For example, the first rotor $36_1$ is coupled with the reel support 32 through a gear mechanism 80 with the speed ratio 1:3 as shown in FIG. 9. If so constructed, the rotor $36_1$ rotates three times for each rotation of the reel support 32. Therefore, provision of such an over-drive gear mechanism increases the number of the conductor pieces $36_2$ equivalently three times. Further, when the rotor $38_1$ is coupled with the reel support 34 through a gear mechanism 82 with the speed ratio 2:5, the rotor $38_1$ rotates two times for every five rotations of the reel support 34. With such a reduction gear mechanism, the number of the conductive pieces $38_2$ is reduced equivalently 2/5. As described above, the ratio m/n may be changed by using the overdrive gear mechanism and/or the reduction gear mechanism. In addition to these mechanisms, a belt transmission or an idler wheel mechanism may be used.

Figure 10:
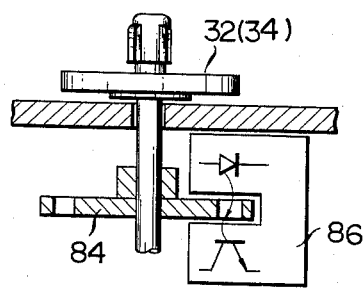
FIGS. 10 and 11 show modifications of pulse generators shown in FIG. 2.
Figure 11:
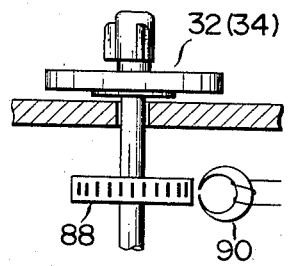

For the pulse generators 36 and 38, electric switches as shown in FIGS. 10 and 11 may be used in place of the mechanical switches mentioned above. In the example shown in FIG. 10, a photo-interruptor 86 is used in which an optical path is interrupted by a disc 84 with holes which rotates interlocking with the reel support 32 or 34. In the case of FIG. 11, a magnetic disc 88 and a magnetic head 90 are used. The magnetic disc 88 rotates interlocking with the reel support 32 or 34 and is provided around the periphery with magnetic pulses recorded. The magnetic head 90 detects the magnetic pulses. A semiconductor Hall element may be used for the magnetic head 90.

The embodiments in FIGS. 7 and 8 may be modified in the following. The pulse generators 38 and 36 are coupled with the reels 12 and 14, respectively. In this case, as the tape running amount increases, the numerical value displayed decreases. In order to increase the display numerical value with increase of the tape running amount, down counters are used for the counters 74 and 76 in FIG. 8 and "3" and "2" are used for the preset data of the input switches $50_2$ and $50_1$. With such a construction, the counters 74 and 76 are counted down 32 times at the initial stage of tape running and thus the tape running position is displayed as "0, 0." At the final stage of tape running, the counters 74 and 76 are counted down with time so that the tape running position is displayed as "2, 4."

Although specific circuit constructions have been illustrated and described herein, it is not intended that the invention be limited to the elements and circuit constructions disclosed. One skilled in the art will recognize that other particular elements or subcircuits may be used without departing from the scope and spirit of the invention.

What we claim is:

1. A display apparatus for tape running positions comprising: a tape transport system in which the rotational speeds of a first reel and a second reel change in accordance with the amount of tape running, a first signal generator for producing m number of pulses constituting a first signal $e_1$ for each revolution of the first reel, a second signal generator for generating n number of pulses constituting a second signal $e_2$ for each revolution of the second reel, counter means for counting the repetitive number of first signals $e_1$ occurring during one period of second signal $e_2$, data preset means for providing to the counter means preset data to offset the count value counted by the counter means at an initial stage of tape running, in order to assign the display depending on the first signal $e_1$ sensed during one period of the second signal $e_2$ at the initial stage of tape running to the start point of the tape running position, and display means connected to a count output circuit of the counter means in order to perform a numerical display corresponding to the tape running amount, said counter means comprising an up/down counter preset by a third signal $e_3$ having the same period as of said second signal $e_2$ and occurring behind the second signal $e_2$, a logic circuit for providing a set signal when the count output of said up/down counter becomes zero in order that, upon completion of the cancelling operation of the count by the preset data provided by said data preset means, the display at the start point of the tape running position is rendered zero; a flip-flop set by the set signal of said logical circuit and reset by the second signal $e_2$, and a gate circuit for applying the first signal $e_1$ to the down-count input terminal of said up/down counter when said flip-flop is reset, and for applying the first signal $e_1$ to the up-count input terminal of said up/down counter when said flip-flop is set.

2. A display apparatus for tape running positions according to claim 1, comprising a power source reset circuit for providing a power source reset pulse in response to the turning on of a power source of the display apparatus, in order to temporarily set said flip-flop at the initial stage after the power source is turned on, and an OR gate for resetting said flip-flop by the logical sum of the power source reset pulse of said power source reset circuit and the second signal $e_2$.

3. A display apparatus for tape running positions comprising: a tape transport system in which the rotational speeds of a first reel and a second reel change in accordance with the amount of tape running, a first signal generator for producing m number of pulses constituting a first signal $e_1$ for each revolution of the first reel, a second signal generator for generating n number of pulses constituting a second signal $e_2$ for each revolution of the second reel, counter means for counting the repetitive number of first signals $e_1$ occurring during one period of second signal $e_2$, data preset means for providing to the counter means preset data to offset the count value counted by the counter means at an initial stage of tape running, in order to assign the display depending on the first signal $e_1$ sensed during one period of the second signal $e_2$ at the initial stage of tape running to the start point of the tape running position, and display means connected to a count output circuit of the counter means in order to perform a numerical display corresponding to the tape running amount, said counter means including at least one presettable counter, said data preset means including at least one preset data input switch for providing a negative value of the number to be preset, in order to make the display at the start point of said tape running position zero, and said counter in which the preset data of said preset data input switch is preset by a third signal $e_3$ having the same period as the second signal $e_2$ and occurring behind the second signal $e_2$.

4. A display apparatus for tape running position according to any one of claims 1 to 3, in which the ratio of the number of pulses m of the first signal $e_1$ to the number of pulses n of the second signal $e_2$, m/n, is 2 or more.

5. A display apparatus for tape running positions according to claim 4, in which, in order to increase the ratio m/n, said first signal generator is connected to a mechanism which is coupled with the first reel and which provides a higher rotational speed than that of the first reel.

6. A display apparatus for tape running positions according to claim 4, in which, in order to increase the ratio m/n, said second generator is connected to a mechanism which is coupled with the second reel and which provides a lower rotational speed than that of the second reel.

7. A display apparatus for tape running positions according to claim 5, in which said mechanism is a gear mechanism.

8. A display apparatus for tape running positions according to claim 6, in which said mechanism is a gear mechanism.

9. A display apparatus for tape running positions according to any one of claims 1 to 3, in which said first signal generating means includes a mechanical switch which is turned on and off with rotation of said first reel.

10. A display apparatus for tape running positions according to any one of claims 1 to 3, in which said second signal generator includes a mechanical switch which is turned on and off with rotation of said second reel.

11. A display apparatus for tape running positions according to any one of claims 1 to 3, in which said first signal generator includes a photo-interruptor for interrupting the optical path during rotation of said first reel.

12. A display apparatus for tape running positions according to any one of claims 1 to 3, in which said second signal generator includes a photo-interruptor for interrupting the optical path during rotation of said second reel.

13. A display apparatus for tape running positions according to any one of claims 1 to 3, in which said first signal generator includes means for changing a magnetic field during rotation of said first reel, and a magnetic-electric converting means for converting the change of the magnetic field into an electrical signal.

14. A display apparatus for tape running positions according to any one of claims 1 to 3, in which said second signal generator includes means for changing a magnetic field during rotation of said second reel and a magnetic-electric converting means for converting the change of the magnetic field into an electrical signal.

* * * * *